Figure 1:
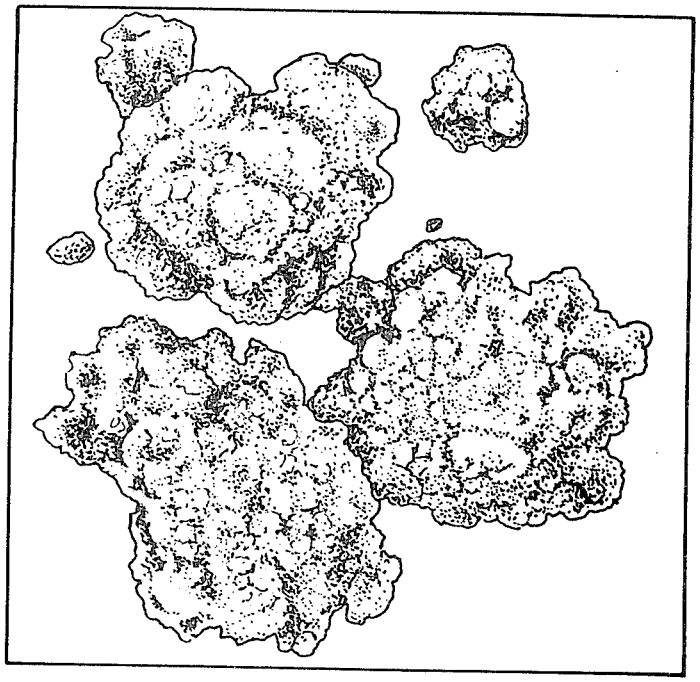

United States Patent [19]

Salome et al.

[11] 4,191,672

[45] Mar. 4, 1980

[54] POLYMER AGGREGATES

[75] Inventors: Frederik Salome; William T. Elliott, both of New South Wales, Australia

[73] Assignees: Berger Jenson & Nicholson Ltd., London, England

[21] Appl. No.: 844,486

[22] Filed: Oct. 21, 1977

[30] Foreign Application Priority Data

Oct. 25, 1976 [AU] Australia .............................. PC7853
Mar. 21, 1977 [AU] Australia .............................. PC9505

[51] Int. Cl.² ............................................. C08L 29/00
[52] U.S. Cl. ......................... 260/29.6 PM; 260/42.43; 260/42.44; 260/31.8 HR; 260/31.8 PQ; 260/31.8 L; 428/402; 526/319; 526/320; 526/303; 526/317; 526/328; 526/330; 526/341; 526/342; 526/346; 526/909
[58] Field of Search ............... 526/909, 346, 328, 330, 526/319, 320, 341, 342, 303, 317; 428/402; 260/29.6 PM, 42.43, 42.44, 31.8 HR, 31.8 PQ, 31.8 L, 861, 862, 872, 830 R, 874, 885, 886, 901

[56] References Cited

U.S. PATENT DOCUMENTS

| 3,725,367 | 4/1973 | Kemp | 526/909 |
|---|---|---|---|
| 3,780,007 | 12/1973 | Stallings | 526/909 |
| 3,814,740 | 6/1974 | Miller | 526/909 |
| 3,880,771 | 4/1975 | Klein | 526/909 |
| 3,976,629 | 8/1976 | Hayward et al. | 526/909 |
| 4,071,653 | 1/1978 | Boessler et al. | 428/402 |

OTHER PUBLICATIONS

Jirgensons et al., A Short Textbook of Colloid Chemistry, Wiley & Sons, Inc., N. Y., 1954, pp. 15, 322, 333–336.

Primary Examiner—Melvyn I. Marquis
Attorney, Agent, or Firm—Wenderoth, Lind & Ponack; Wenderoth, Lind & Ponack

[57] ABSTRACT

Polymer aggregates in the form of discrete particles of controlled particle size below 150 microns maximum dimension which are themselves aggregates of primary particles of a polymer or polymers derived from at least one ethylenically unsaturated monomer together with from 0 to about 400%, by weight on the weight of the monomer, of an organic thickener compatible with the monomer, said aggregate particle containing from 0 to about 95% by weight of pigment and/or extender are made by providing an aqueous dispersion of the monomer and thickener, a hydrophilic colloid being present in the aqueous phase of the dispersion and pigment and/or extender optionally being present in either the aqueous phase or the disperse phase, introducing a polymerization initiator into the aqueous phase of the dispersion, and maintaining the dispersion under conditions of high shear and continuing polymerization to substantial completion thereof. The aggregates are useful in coating compositions e.g. to provide a matt finish.

21 Claims, 3 Drawing Figures

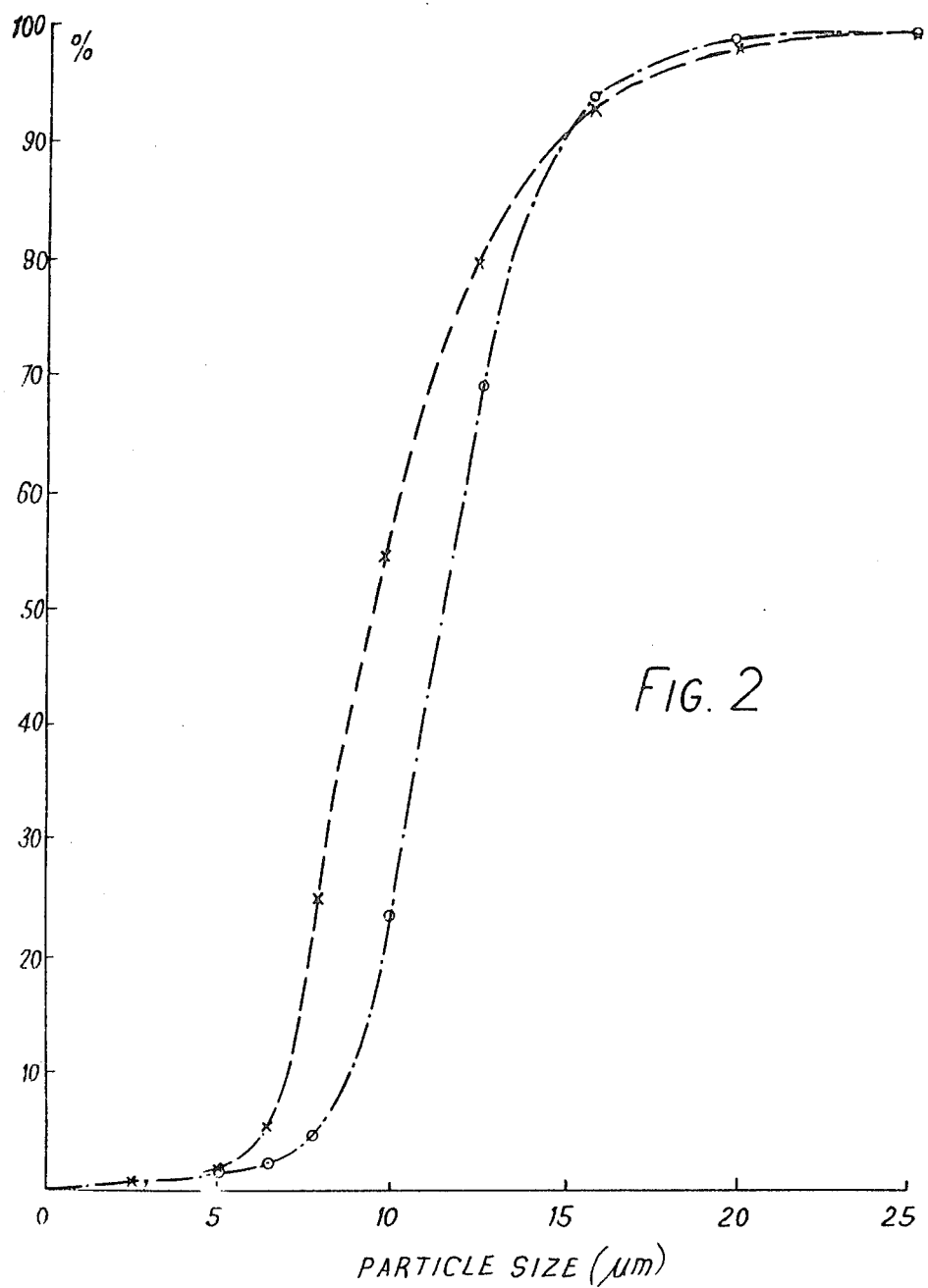

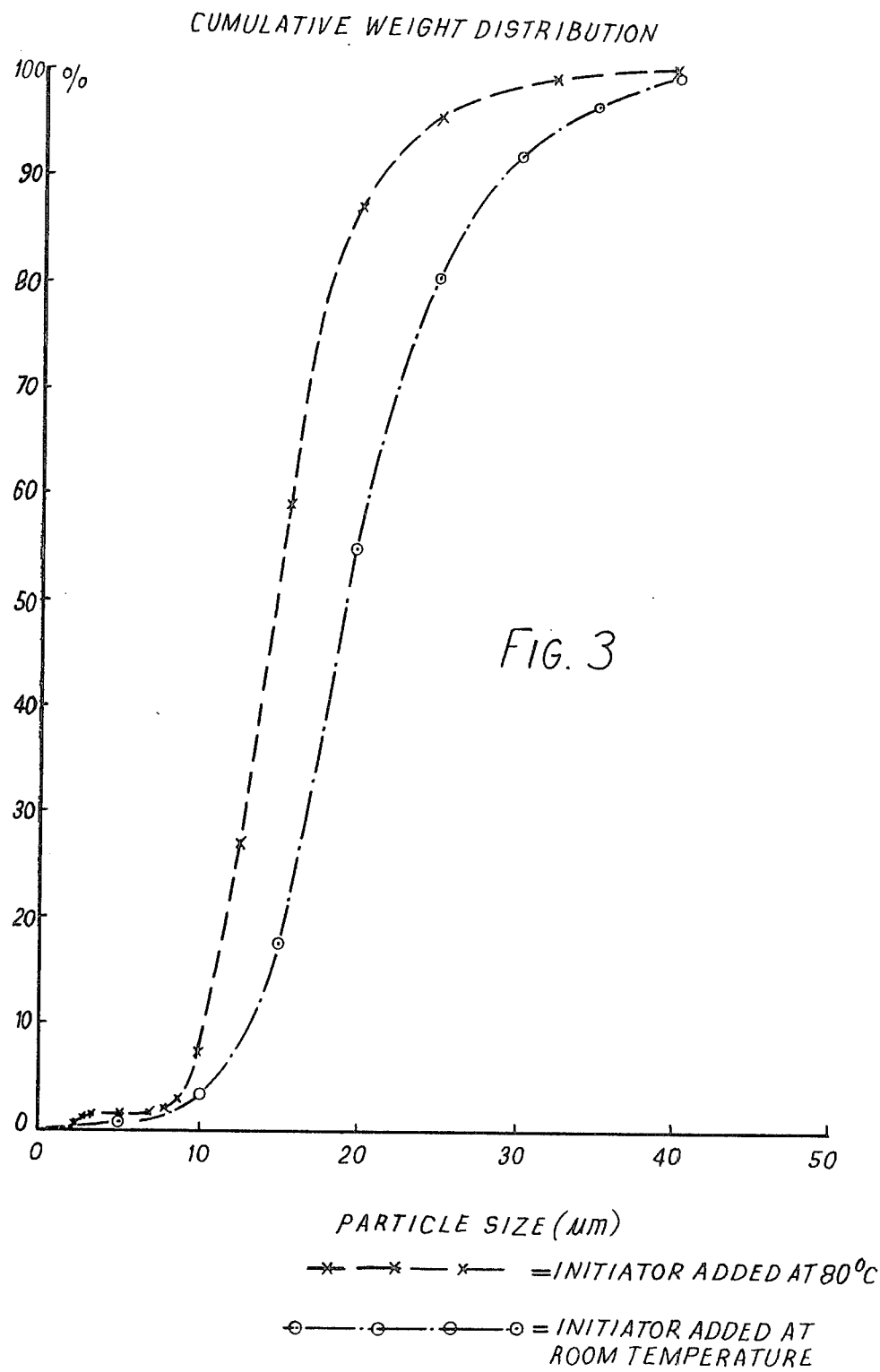

POLYMER AGGREGATES

This invention relates to novel polymer aggregates optionally containing pigments, to processes for the production of such aggregates and to paints containing such aggregates.

The term "polymer aggregates" as used herein, means polymeric particles formed by aggregation of a plurality of smaller particles. On microscopic examination of materials produced by particular embodiments of the process, one may distinguish between "Primary Particles" which are the units from which the aggregates appear to be formed, "first stage aggregates", which appear to consist of a number of primary particles fused together, and "second stage aggregates" which appear to be agglomerates consisting of a number of first stage aggregates.

The first stage aggregates may be very extensively fused together, frequently to the point at which the primary particles cannot be differentiated therein. The second stage aggregates are usually seen to be less extensively fused and the first stage aggregates of which they appear to be composed can more readily be recognised.

It is well known to those skilled in the art how to produce small discrete polymer particles, not aggregates, by polymerisation of alpha-beta-ethylenically unsaturated monomers or monomer solutions of unsaturated polyester resins in suspension in an aqueous phase, the reaction being initiated by a catalyst soluble in the polymerisable material.

This process, known as suspension polymerisation, produces spheroidal particles of sizes essentially determined by the size of the particles produced in the suspension before polymerisation. Depending on the details of the process used and the compatibility of the components, the particles may be visible under the optical microscope as smooth-surfaced, clear transparent particles. Opaque particles may also be prepared by incorporating pigment in the polymerisable components before they are suspended in the aqueous phase.

In the process of suspension polymerisation the objective is to prepare discrete particles of the desired size. To this end, reactant concentration, reaction temperatures and agitation as well as other operating parameters such as colloid concentration and type, and aqueous phase viscosity are adjusted to prevent fusion of particles during polymerisation.

It is also known to prepare stable, fine particle-size, synthetic latices by the emulsion polymerisation of unsaturated monomers using water soluble free-radical initiators and as stabilisers anionic or combinations of anionic and nonionic dispersing agents and optionally, selected representatives of a wide variety of hydrophilic colloids. The mechanism of such emulsion polymerisation processes is not yet completely understood, however it is clear that such latex particles are not formed by polymerisation of suspended droplets such as occurs in suspension polymerisation as described above. During emulsion polymerisation particle growth from minute submicroscopic-particle size to the ultimate particle size can be demonstrated.

Such latices are stable suspensions of particles usually spherical in shape and depend on their content of dispersing agent and hydrophilic colloid to maintain the discrete identity of their constituent particles. Particle size of such latices normally varies between about 0.15 to about 1.0 microns.

Uncontrolled aggregation of latices during manufacture can readily arise from a variety of causes including the presence of high concentrations of electrolytes, high shear, insufficient surfactant, or surfactant of the wrong type and so on. The aggregates so produced may vary in size from a few microns to many centimeters in diameter. Typically they are highly hydrated and exhibit low mechanical strength. Latex aggregates of this uncontrolled type are likely to become swollen or dissolved by the co-solvents and plasticizers conventionally used in the formulation of water-based paints having synthetic latex binders.

This invention is based on the discovery that polymer aggregates of controlled size having useful properties may be prepared by polymerising suitable monomers in an aqueous medium in the presence of free-radical initiators under conditions of high shear.

In one aspect, this invention provides polymer aggregates in the form of discrete particles of controlled particle size below 150 microns maximum dimension which are themselves aggregates of primary particles of a polymer or polymers derived from at least one ethylenically unsaturated monomer together with 0 to about 400%, by weight on the weight of the monomer, of an organic thickener compatible with the monomer, said aggregate particles containing from 0 to about 95% by weight of pigment and/or extender. The polymer aggregate particles of this invention are of irregular shape, and it is therefore not realistic to talk about the diameter of the particles. While the maximum aggregate particle dimension should not in general exceed 150 microns, it will be understood that a small number of larger particles would not necessarily be detrimental in some circumstances. Where the polymer aggregates are to be used in a coating composition, the particles should preferably not be significantly larger than 50 microns. Thus, preferably 80% of the aggregate particles should have a maximum dimension of no greater than 50 microns. A substantial number of larger particles would tend to give a gritty texture to the paint surface.

The Coulter Counter data we have obtained makes it evident that our comments on particle size as perceived by electron or optical microscope correlate with weight or volume particle size. Thus when we speak of aggregates with an average maximum dimension of 10 micrometers, this means that the weight average particle size is 10 micrometers. When we say for example 'first stage aggregates of maximum dimension 5–10 micrometers' we mean that more than 80% of the weight or volume of particles will comprise those particles having a maximum dimension of 5–10 micrometers.

A major use for the polymer aggregates of this invention is to provide a matt finish and burnish resistance for paints, and for this purpose, 80% by weight of the aggregate particles should preferably have a maximum dimension in the range 10 to 40 microns, particularly 15 to 30 microns. Another use of the polymer aggregates is as pigment carriers, and for this purpose 80% by weight of the aggregate particles may advantageously have a maximum dimension of from 0.5 to 30 microns, particularly from 2 to 10 microns for conventional flat latex paints, and from 0.5 to 1 microns for latex paints containing low proportions of latex binder.

In contrast to the uncontrolled aggregates that can be obtained by emulsion polymerisation, the polymer aggregate particles of the present invention can be made of substantially uniform size. Typically, at least 50% and preferably at least 80% by weight of the aggregate particles will have a maximum dimension of between half and twice the weight average maximum dimension of the aggregate particles in the batch. The invention contemplates polymer aggregates of substantially uniform particle size; and also aggregates in controlled ranges of particle sizes and optionally in admixture with primary particles.

The aggregate particles may be approximately spherical or chunky or elongated or provided with spines, depending on the conditions of preparation. Depending also on the conditions of preparation, the primary particles constituting the aggregates may be readily visible in electron microscope pictures of the aggregates or may be substantially fused together. Typically, the primary particles will be generally spherical with an average diameter of from 0.2 to 2.0 microns, though the precise size and shape of the primary particles are not critical to the invention.

The accompanying drawing shows typical polymer aggregates according to the invention, produced in fact according to Example 2 below.

The one or more ethylenically unsaturated monomers from which the polymer aggregates of this invention are derived are preferably vinyl ($CH_2=CH-$) or vinylidene ($CH_2=C=$) monomers. Suitable monomers include vinyl and vinylidene aromatic monomers; acrylates and methacrylates such as methylmethacrylate, ethylacrylate, ethylhexylacrylate, and laurylmethacrylate; vinyl acetate; acrylonitrile and methacrylonitrile; acrylamides and methacrylamides; acrylic and methacrylic acid; hydroxyethyl and hydroxypropyl acrylates and methacrylates; and mixtures thereof. Styrene is not suitable by itself, but can be used with advantage in admixture with one or more other monomers or with disperse phase thickener. It may be advantageous to include a minor proportion of a di-unsaturated monomer, for which purpose, for example, ethylene glycol dimethacrylate and divinylbenzene are suitable. While the water solubility of the monomer or lack of it is not regarded as a limiting factor, it appears that the kinetics of polymerisation are greatly influenced by the water solubility of the reactants, as more fully discussed below. The coalescing temperature of the polymer is preferably, though not essentially, at least as high as the polymerisation temperature; otherwise, there is a risk of the discrete aggregate particles sticking together during or after polymerisation unless conditions of high shear are maintained until the temperature has fallen below the coalescing temperature of the aggregates. When a reactive polymeric thickener, such as an unsaturated polyester resin, (as discussed below) is present, such considerations do not arise; but in the absence of cross-linking components, the coalescing temperature is one factor to be taken into account in determining the choice of monomer.

The monomer may advantageously be used in admixture with up to 400% preferably from 10 to 100%, by weight on the weight of the monomer, of an organic thickener compatible with the monomer. The thickener may be co-polymerisable with the monomer, such as an unsaturated polyester resin, in which case polymerisation of the monomer will cause cross-linking of the polyester. An appropriate choice of monomers and reactive or inert disperse phase thickeners can result in thermoset or thermoplastic polymer aggregates.

Polyester resins which for example have been used in the production of the polymer aggregates of the invention are condensation products of polybasic acids (or the corresponding anhydrides) with dihydric alcohols, and incorporating polymerisable unsaturation by means of an alpha,beta-unsaturated dicarboxylic acid or anhydride. Other reactants including monofunctional saturated or unsaturated aliphatic or aromatic acids, monofuntional alcohols or alcohols of higher functionality may also optionally be present.

The methods by which such polyester resins are formulated and prepared are well known to those skilled in the art. A polyester produced from 3 moles maleic anhydride, 1 mole phthalic anhydride and 4.4 moles propylene glycol and having acid value 38 (mg. KOH/gm) and viscosity 18 poises at 70% NVM in styrene has been used with success in experimental examples. This polyester resin is illustrative of suitable resins, however it is not to be construed as a limitation on the types of polyester which may be used.

Alternatively, the thickener may be inert in the system, for example a saturated polyester resin, an acrylic polymer, an epoxy resin, a polyester resin a polystyrene or a plasticizer such as benzyl-butyl phthalate. A suitable saturated polyester is that sold by Shell Chemicals under the Trade Mark Cardura DX 52, which may be used in solution in methylmethacrylate. The probable function of the organic thickener is discussed below.

The polymer aggregate particles may include from 0 to about 95% by weight of a pigment and/or extender or other particulate matter. The preferred proportion of pigment or extender depends on many factors, including the nature of the pigment or extender; for example, in the case of pigmentary titanium dioxide a range of 40% to 80% by weight may be mentioned. Much lower proportions of organic or colour pigments might be appropriate, depending on circumstances. The nature of the pigment or extender is not critical. By extender we mean inorganic particulate matter which lacks the substantial opacity of pigment. Depending on the method of preparation, as more fully described below, the pigment particles may be distributed uniformly through the polymer aggregate particles, or alternatively may be predominantly or totally on the surface or in the core of the aggregate particles. It is an advantage of this invention that it permits the incorporation of a higher proportion of pigment and/or extender in polymer particles than has previously been possible. Also it permits the effective use of extenders as a partial or complete replacement for pigment.

When the polymer is derived from a single monomer or from a mixture of compatible monomers, the primary particles may be transparent or translucent (provided they do not contain pigment), in which case the aggregate particles may also be to some extent translucent. When an organic thickener is present which is not compatible with the polymer (though it was compatible with the monomer) the polymer aggregates and the primary particles constituting them will be opaque. Thus, whether pigmented or not, the polymer aggregate of this invention will in general be opaque, and may advantageously be used in paints in place of some or all of the pigment to provide covering power. Opacity can be optimised by control of particle size in accordance with known criteria. We have made unpigmented coating compositions containing polymer aggregate according to this invention and having a Contrast Ratio of greater than 50% (ASTM D2805/70).

In another aspect, the invention provides a method of making the polymer aggregates herein described, which method comprises:

(a) providing an aqueous dispersion of at least one ethylenically unsaturated monomer together with from 0 to about 400%, by weight on the weight of the monomer, of an organic thickener compatible with the monomer, a hydrophilic colloid being present in the aqueous phase of the dispersion, (b) introducing a polymerisation initiator into the aqueous phase of the dispersion.

(c) maintaining the dispersion under conditions of high shear and continuing polymerisation to substantial completion thereof.

The monomer, together with the organic thickener when present, preferably constitute from 5 to 45%, for example 20 to 35%, by weight of the aqueous dispersion. A small proportion of the monomer will be soluble in the aqueous phase, and is believed to be especially significant in the early stages of polymerisation.

The dispersion of the discontinuous phase in the aqueous phase is unstable. While the size of the disperse phase droplets varies according to the composition of the aqueous phase, the rate of shear, etc., there is no direct correlation with the size of the polymer aggregates or the primary particles of which they are formed.

It is usual to include a hydrophilic colloidal material in the aqueous phase of suspension polymerisation systems, and the use of such hydrophilic collid is advantageous in the present method also. We have found that polyvinyl alcohol and polyacrylates may advantageously be included, suitably at a concentration of from 0.05 to 5%, preferably from 0.1 to 2% by weight of the aqueous phase. A suitable material is an 80% hydrolysed polyvinyl alcohol having a viscosity of 36 centipoise at a concentration of 2% in water. Other hydrophilic colloids however may also be employed, such as gelatin, gum arabic and that marketed by Hoechst AG. under the Trade Mark Colloid A2. Such materials are to be distinguished from low molecular weight colloids of the type usually known as dispersing or emulsifying agents.

In selecting a suitable colloid level and type it should be noted that at unsuitably low levels of colloid a product having large numbers of primary particles and massive quantities of large aggregates which are too large to be readily distinguished as first stage or second stage aggregates are formed. By increasing the colloid level the number of primary particles is decreased and the average size of the aggregates is also decreased. By choice of colloid level and type, products consisting of first stage aggregates only or of a mixture having the desired proportions of first stage aggregates and primary particles, may be produced.

Surfactants are not adequate substitutes for colloids, but may be used in small amounts in addition to colloids to reduce the particle size of either the primary particles or of the aggregates.

The production of polymer aggregates containing pigment is also contemplated by the method of the invention. In the production of pigmented aggregates, we have found that three different approaches may be employed. The methods described in the prior art as applicable to suspension polymers, i.e. dispersing the pigment in the polymerisable material, may be employed, and are particularly useful when pigments which are not readily dispersed in water are to be incorporated. An alternative method, which is particularly useful where aqueous pigment slurries are available, is to add the pigment, dispersed in water, to the aqueous phase. The pigment is then picked up or captured and amalgamated into the polymer aggregates together with the primary particles. It is an advantage of this invention compared with conventional suspension polymerisation processes that it can make use of pigment in aqueous dispersion. This technique of capturing pigment from the aqueous phase is also advantageous in that it enables very high pigment loadings of up to about 95% by weight of the aggregate, far higher than is obtainable by suspension polymerisation, to be achieved.

The method of this invention can be employed to pick up a wide variety of particles or droplets as nuclei of the polymer aggregates. Organic and inorganic pigment particles, polymer beads and preformed aggregate particles can all be captured from the aqueous phase of the initial dispersion as described above. It is an advantage of the process that such diverse solid particles do not require any surface pretreatment or modification for incorporation in the polymer aggregates. Liquid droplets or gas bubbles may be similarly captured. Thus when a toxic material such as tributyl tin oxide is dispersed in the aqueous phase of the starting dispersion, the droplets are captured and incorporated in the polymer aggregates during their formation to provide a product which slowly releases toxicant over a prolonged period. When an inert organic liquid such as a hydrocarbon which is substantially insoluble in either the aqueous phase or the disperse phase and substantially non-volatile under the conditions of polymerisation is dispersed in the aqueous phase of the starting dispersion, the droplets are captured and incorporated in the polymer aggregates during their formation; subsequent evaporation of the inert organic liquid provides polymer aggregates with internal voids which improve their opacity. Aggregates with internal voids can also be prepared by incorporating air bubbles of suitable size in the polymerising dispersion.

It is possible to modify the properties of the polymer aggregates of this invention by coating them with a polymeric material. This coating polymer may be different from that constituting the bulk of the polymer aggregates, thus giving the aggregates distinctive surface properties. Alternatively, the polymer may be the same as that constituting the bulk of the aggregates. The coating polymer may be used to pick up pigment and deposit it on the surface of the pre-formed aggregates. Thus for example one or more polymerisable ethylenically unsaturated monomers may be introduced into a dispersion of preformed aggregates, while maintaining conditions of high shear as before, together with a suitable catalyst and, if desired, pigment and the dispersion heated to effect polymerisation of the monomer which can be arranged to pick up the pigment and coat the surface of the pre-formed aggregates. The ratio of polymerisable material to pigment should be such that the pigment coating is not underbound. Thus a suitable ratio might be 4 parts wt. $TiO_2$ and 1 part wt. of polymerisable material giving a volume ratio of 1:1 and a preferred volume range might lie between 1:2 and 2:1.

All these variations of the method can be performed essentially without altering the polymerisation conditions, to provide aggregates of controlled properties in very high yields.

Improved control of the particle size of the aggregates may be obtained by increasing the ionic content of the aqueous phase of the dispersion. We have successfully used supernatant water from a previous polymerisation batch, and have also (in separate experiments) added ammonium sulphate and sodium chloride to aqueous dispersions in water, though we believe that the nature of the salt used is not critical. The particle size distribution of the products of these runs was exceptionally narrow. It is preferred that the salt concentration excluding polymerisation initiator of the dispersion not exceed 3.0% by weight of the disperse phase. The use of salts in higher concentrations tends to depress the solubility of the unsaturated monomer and/or the colloid in the aqueous phase and so interfere with particle size control.

In order to control the molecular weight of the polymer in the aggregates, it may be advantageous to include in the dispersion a chain transfer agent, for example, isopropanol, a mercaptan, a thiourea, chloroform or carbon tetrachloride.

Initiation by an oil-soluble polymerisation initiator would result in the production of spherical beads of polymer by an essentially suspension polymerisation process. In order to form the polymer aggregates which are characteristic of the present invention, it is essential that a polymerisation initiator be used which dissolves preferentially in the aqueous phase of the dispersion. Free-radical initiators of this kind are well known, and the choice is not critical. Persulphates, for example sodium, potassium and ammonium persulphate are particularly suitable, but perborates, zinc formaldehyde sulphoxylate/hydrogen peroxide, persulphate/hydrogen peroxide, ferrous sulphate/hydrogen peroxide, may also be used. At the end of the polymerisation it is advantageous to introduce a further batch of catalyst to convert any residual unsaturated monomer. It is not important at this later stage whether the catalyst is water—or oil-soluble, and a redox catalyst such as sodium metabisulphite/tertiary butyl hydroperoxide is suitable. The total amount of catalyst used is not critical. Enough should be used to achieve polymerisation in an acceptable time. Amounts of from 0.5 to 3% by weight on the weight of the polymerisable material are usual.

A major factor in determining the choice of polymerisation initiator is the temperature at which it is desired to perform the reaction. Aqueous based peroxy initiators are typically effective at temperatures in the range of 55° to 90° C. For example, ammonium persulphate is advantageously used at a temperature of 80° C. Initiator may conveniently be added to the reaction mixture either before or after it has been heated to the desired reaction temperature; addition to the hot mixture generally gives rise to smaller aggregate particles of more uniform size.

The reaction time is important, for it affects both the aggregate particle size and the degree to which primary particles are coalesced in the aggregate. In general, shorter reaction times give rise to smaller polymer aggregates. Excessively long reaction times may give rise to products approaching the spherical polymer beads that are obtained by conventional suspension polymerisation. Reaction time can be controlled in various ways, e.g. by suitable choice of; the concentration of initiator; the reaction temperature; the nature of the monomer; or the temperature at which the initiator is added. Shear, disperse phase viscosity, colloid level etc., control the particle size of the aqueous dispersion which also has an effect on reaction time.

In general, the reaction should be substantially complete within one hour in the reaction temperature range, and fully completed within two hours. In continuous operation, the residence time of the polymerisable material would be less than two hours and generally less than one hour.

As is standard practice in the polymerisation art, the monomer and the initiator may be added by increments during the course of the polymerisation reaction. Incremental addition of monomer can be advantageous in giving rise to polymer aggregates in a controlled range of particle size. It is not necessary for air to be excluded at any stage of the process.

The process of the invention has been carried out in a variety of reaction vessels provided with various agitators. It has been found that it is preferable to ensure that the reactor shape provides no dead spots where polymer may be deposited. It is also desirable that the tank geometry take into account the need to cover the impeller under the prevailing shear conditions. For this reason, flat bottomed vessels are preferred though vessels with dished bottoms have successfully been employed.

A variety of agitator types and speeds may be employed. Conventional turbines running at slow speeds produce larger primary particles than agitators such as those of the Torrance and the Cowles dissolver type revolving at higher speeds. Flat disc impellers with pump holes. though producing more fine primary particles, produce polymer aggregates with a higher proportion of secondary aggregates than Cowles at similar impeller diameter and shaft speeds. An otherwise unsatisfactory agitator however can be vastly improved by running at higher speed or by an adjustment of tank diameter to impeller diameter. We prefer to use a Cowles agitator having a diameter about 0.8 of the tank diameter; or a Torrance agitator with a diameter 0.5 to 0.6 of the tank diameter. In general it appears that increasing shear reduces the size of the first stage aggregates and the number of second stage aggregates present. It is thought that the peripheral velocity of the rotating agitator should be at least 2 meters per second, and preferably at least 5 meters per second to provide suitable shear conditions.

Agitators of these kinds and operated at these speeds produce conditions, not only of high shear, but also of cavitation and turbulence. It is envisaged that other forms of agitation which give rise primarily to cavitation and/or turbulence may also be effective in controlling the size of the polymer aggregates. The term "high shear" as employed herein includes also such effective conditions of cavitation and/or turbulence.

While we do not know why the method of the present invention is effective in producing polymer aggregates of controlled particle size, we believe that the explanation may be along these lines. Polymerisation of the unsaturated monomer is initiated in the aqueous phase, and it is thus the small proportion of the monomer dissolved in water that first polymerises. Under the conditions of high shear, the polymerising monomer comes in contact with the dispersed phase, which consists of unsaturated monomer, possibly containing pigment and/or an organic thickener. Free radicals are thus transferred from the aqueous to the non-aqueous phase, and polymerisation then continues in the disperse phase particles. These disperse phase particles are initially unstable (they can be seen to coalesce quite rapidly under the microscope), but are maintained in dispersion by the conditions of high shear. The polymerisation proceeds in both the aqueous and disperse phases resulting in the formation of primary particles which coalesce to form aggregates, the high shear conditions limiting the size of the aggregates and tearing apart those that grow too large.

We have observed on plant batches that during the reaction the power required for constant agitation is relatively constant up to a particular stage of the reaction, at which stage it increases rapidly by about 40%. The stirring pattern changes at this point (the vortex drops). After a short period (a few minutes) the earlier stirring pattern reappears and the power consumption falls to the original level. It seems that the microscopic appearance of the dispersion before and after this stage is quite different. Before this stage no aggregates can be seen and pigment, if originally present in the aqueous phase, is still there. After this stage aggregate formation is apparently complete and the pigment is in the aggregate. This stage is the one referred to as the 'sticky' stage and is that part of the reaction in which particles are picked up or captured to form aggregates.

We infer from observations of reaction time, the exothermic behaviour of the reaction, the measurement of monomer consumption in comparable system, that polymerisation of methylmethacrylate (which is relatively soluble in water) is initiated much more quickly than is polymerisation of styrene (which is relatively insoluble in water). Though the kinetics of polymerisation appear to be very different, the resulting polymer aggregates do not. It is necessary that the dispersion should be subjected to high shear from the start of polymerisation (which may be effected by adding the catalyst or by heating the initiator-containing dispersion to a temperature at which the initiator becomes effective) until the sticky stage of polymerisation has been passed. In practice, conditions of high shear are preferably maintained until polymerisation has been completed. Normally, the coalescing temperature of the polymer will be higher than the polymerisation temperature; where this is not the case, it may be desirable to maintain the conditions of high shear while cooling the polymerised system to a temperature below the coalescing temperature of the polymer.

Accordingly it will be understood that the particle size of the polymer aggregates can be controlled in various ways. The use of higher shear during polymerisation leads to smaller particle aggregates and also to fewer primary particles. Regardless of the combination of reactants used there is a limiting minimum weight average particle size determined by the shear conditions employed. Thus shear may be seen to be the most important single control of particle size. The use of a higher colloid level in the dispersion leads to smaller polymer aggregates and to fewer primary particles. The presence of a higher content of orgnaic polymeric thickener in the disperse phase gives rise to smaller polymer aggregates. The presence of pigment in the dispersion, either in the aqueous phase or in the disperse phase, results in smaller polymer aggregate particles. The presence of salts in the aqueous phase of the dispersion enhances control over the particle size. Shorter reaction times give rise to smaller polymer aggregates. By exercising control over these variables, in conjunction with the other variables of the system, a very considerable degree of control can be achieved over the aggregate particle size. If required, polymer aggregates of substantially uniform particle size and of a desired uniform particle size can be prepared. Alternatively, it is equally possible to make aggregates having a desired range of particle sizes, or to make a mixture of aggregates and primary particles in desired proportions. The method is very versatile and gives rise to high yields of the desired products.

Often, the polymer aggregates will be used in the aqueous dispersion in which they are formed, but if desired they may readily be recovered. A convenient process is to allow the aggregate to settle, decant off the supernatant liquid and use the resulting slurry. If desired, the slurry can be filtered to recover a filter cake, which may be dried by spray drying or other conventional means. Alternatively, the aggregates may be recovered by centrifuging the dispersion. By drying the aggregates, it is possible to obtain a material that readily forms a free-flowing powder. The method used to recover the aggregates will be dependent on the nature of the aggregates—particularly their coalescing temperature—and the proposed end use.

The polymer aggregates of this invention have properties which make them useful in a variety of fields. They can be used in paints to provide opacity and good resistance to removal of paint films by wet abrasion. Polymer aggregates of suitable sizes provide a matt finish to paint films. The use of pigmented polymer aggregates provides a convenient way of incorporating some or all of the pigment in a paint. In some circumstances, pigment dispersed in polymer aggregate particles has better hiding power than pigment dispersed in a conventional paint formulation. The polymer aggregate particles may be used as the sole film-forming component of a coating composition, coherent films being formed on a substrate by fusion.

The invention accordingly also encompasses paints containing the polymer aggregates herein described. The paint may be aqueous-based or oil-based, though the water wetting polymer aggregates must be substantially removed, e.g. by drying or flushing before they can be used in oil-based paints. The paint will contain a pigment; but where pigmented polymer aggregates of this invention are used, part or all of the pigment may be contained in the polymer aggregates. The polymer aggregate may suitably be present in a proportion of from 5 to 85, preferably from 10 to 60% by volume on the volume of the non-volatile material. When all the pigment is contained in the polymer aggregates, it is preferred to use a high proportion of aggregates, for example at least 50% by weight on the weight of the nonvolatile material. On the other hand, when pigment is present separately from the polymer aggregates, we prefer to use a lower proportion of aggregates, typically less than 40% by weight on the weight of the non-volatile material to provide burnish resistance.

British Patent No. 1,328,878 relates to a latex composition which forms continuous opaque films, comprising an aqueous continuous phase and particles of coalescable polymer dispersed therein, said composition containing a non-solvent for said coalescable polymer in an amount and of sufficiently low volatility as to produce, upon first removing water from said continuous phase and secondly removing said non-solvent, a continuous, non-porous, microcellular and opaque firm having minute, discrete and substantially closed voids. The use of a high-boiling non-solvent liquid in this manner in paints according to the present invention can provide advantageous formulations having high opacity for minimum pigment content. Compositions containing such a high-boiling non-solvent in conjunction with polymer aggregates of the present invention can have particularly advantageous properties.

The following Examples illustrate this invention. All parts and percentages are by weight unless otherwise stated.

The first four Examples illustrate the effect of varying the shear.

EXAMPLE 1

A solution of 20.7 gm of polyvinyl alcohol (as described above) in 4500 gms of water, was prepared and cooled to 15° C. Into this colloid solution was dispersed by stirring for one hour at 1500 rpm 1300 gms of a 40% solution in styrene of a polyester resin produced from 3 moles maleic anhydride, 1 mole phtalic anhydrides and 4.4 moles propylene glycol having an acid value 38 (mg. KOH/gm) and viscosity 18 poises at 70% non-volatile material in styrene. The reaction vessel was a water-jacketed flat bottomed cylindrical vessel 170 mm in diameter, 350 mm high, fitted with a lid, having a stirrer gland and sealable addition port. The impeller was a 125 mm flat disc having eight 12.7 mm pump holes. 39 gm of ammonium persulphate were added and the batch was heated to 80° C. with continued agitation at 1500 rpm over 45 minutes. Reaction was complete after two hours at 80° C. The reaction mixture was cooled and allowed to settle overnight.

A slurry of aggregates having a solids content of 36% was recovered.

Microscopic examination showed a mixture of some primary particles of sizes too small to be accurately determined by optical microscope, while the majority of particles were first stage aggregates of 5–10 microns, with a few second stage aggregates up to 25 microns maximum dimension.

EXAMPLE 2

The experiment of Example 1 was repeated using a 110 mm diameter "Cowles" type agitator, running at 1500 rpm. The product consisted uniformly of first stage aggregates of maximum dimension about 15 microns. A drawing showing the characteristic appearance of these particles is attached as FIG. 1.

EXAMPLE 3

The above experiment was repeated using a 150 mm diameter flat disc impeller having eight 12.7 mm. pump holes, running at 600 rpm.

The slurry of agglomerates contained some primary particles of size 1–2 microns, while the bulk of the product was first-stage aggregates of maximum dimension about 25 microns. There were also a significant number of a second stage aggregates with a maximum dimension of about 50 microns.

COMPARATIVE EXAMPLE 4

The experiment was repeated using the equipment of Example 3, running at 300 rpm.

The aggregates collected contained:

A few small particles of diameter 2–5 microns.

A major proportion of first stage aggregates of maximum dimension 75 to 100 microns.

A substantial number of second stage aggregates of size up to about 300 microns.

EXAMPLE 5

The reactor used was a stainless steel dish-bottom kettle 120 cm internal diameter and 135 cm internal height heated by hot water jackets and fitted with a saw-tooth type impeller of 90 cm diameter, 50 cm above the bottom, rotated at 280 rpm. A batch reaction was performed:

| Ingredient | Weight (kg) |
| --- | --- |
| Water | 600 |
| Polyvinyl Alcohol | 2.7 |
| Defoamer | 0.005 |
| Polyester Solution | 175 |
| Ammonium Persulphate | 4.5 |
| T-Butyl Hydroperoxide | 0.53 |
| 25% Ammonia | 6 |
| Sodium Metabisulphite | 0.27 |

The polyester solution was a solution of 40% of unsaturated polyester in 60% of a mixture of equal parts of styrene and methylmethacrylate. The reaction mixture was heated to 70° C., at which point the initiator was added and the reaction was thereafter complete in 25 minutes. The resulting polymer aggregates had particle sizes in the range 10–40 microns, mostly 15–30 microns.

Examples 6–9 illustrate the effects of varying the colloid levels and type.

COMPARATIVE EXAMPLE 6

The apparatus and method of Example 1 were used, however the polyvinyl alcohol was omitted.

The product consisted of large agglomerates of size between about 100 and 1000 microns. A large number of primary particles were also present. The walls and bottom of reaction vessel, were coated with an adherent layer of product.

EXAMPLE 7

Example 1 was repeated using 5.2 g of polyvinyl alcohol.

The product consisted of first stage aggregates, with a maximum dimension between 20 and 40 microns. Isolated first stage aggregates of maximum dimension up to 60 microns were present.

EXAMPLE 8

Example 1 was repeated replacing the polyvinyl alcohol with 4.5 gm of Colloid A2 (Hoechst AG).

The product consisted of first stage aggregates between 50 and 100 microns maximum dimension and a large number of primary particles of very small size.

EXAMPLE 9

Example 1 was repeated replacing the polyvinyl alcohol with 21 gms of Colloid A2 (Hoechst AG). The product consisted of first stage aggregates of 30 to 40 microns maximum dimension.

Examples 10 and 11 illustrate two means of preparing aggregates containing pigment.

EXAMPLE 10

Using a Cowles type agitator rutile titanium dioxide (300 gm) was dispersed in the minimum amount of an unsaturated polyester solution in styrene containing 70% solids, grinding being continued until a fineness of 7 reading on the Hegman gauge was obtained. Further polyester solution was then slowly added with agitation, until a total of 685 gms polyester was present. 515 gms of styrene was then added with stirring. This material was then immediately added to the reactor, replacing the 40% polyester solution of Example 2.

The remainder of the procedure followed that of Example 2.

After settling overnight and removing excess water, the product was isolated as a smooth white slurry having 47% NVM.

Microscopic examination showed a product having the appearance of that of Example 2, including some primary particles of small size, while the bulk of the material was first stage aggregates of maximum dimension 6–10 microns with some second stage aggregates with maximum dimension up to 40 microns.

EXAMPLE 11

To an aqueous phase consisting of 20.7 gms of polyvinyl alcohol dispersed in 4500 gm of cold water was added 480 gm unsaturated polyester dissolved in 720 gm styrene. The mix was agitated for 30 minutes at room temperature, using a 110 mm diameter Cowles agitator, running at 1500 rpm. The tank described in Example 1 was used.

300 g of rutile titanium dioxide RCR6 were dispersed in 730 g of water, under a Cowles agitator and agitation was continued until a Hegman fineness of 7 was obtained. The titanium slurry was then run into the reactor, 39 g of ammonium persulphate was added and the reaction carried out as in Example 1.

After settling, a slurry having 48% NVM, was recovered.

Microscopic examination showed a product having the appearance of that of Example 2, including:

A small number of primary particles of indeterminate size. Examination by transmitted light, showed these were not titanium dioxide.

The remainder of the particles were first stage aggregates of maximum dimension 5–10 microns. A small number of second stage aggregates, with maximum dimension up to 25 microns were also present.

EXAMPLE 12

A disperse phase consisting of a solution of 260 g of a polyester (which itself contained only 11% unsaturation compared with 27% for the polyester used in previous Examples) in 195 g of styrene and 195 g of methyl methacrylate was dispersed in 2250 g of an aqueous 0.5% polyvinyl alcohol solution. 20 g of ammonium persulphate were added and the mixture was polymerised by heating to 80° C. Reaction was complete after 40 minutes. The reactor used had an internal height of 27 cm and an internal diameter of 14 cm, fitted with a 12 cm Cowles-type impeller rotating at 2200 rpm. The resultant aggregates were mostly in the 10–15 μm range.

The experiment was repeated, but this time only 20% of the disperse phase and 50% of the initiator were added initially. The remaining polyester solution was added over 30 minutes commencing at the point when the batch reached 80° C. At the completion of addition, the rremaining initiator was added. The particle size range had broadened, although only subtly so. The change is demonstrated by Coulter Counter analysis, the result of which is shown in FIG. 2 of the accompanying drawings. Comparing the cumulative weight percent graphs, it can be seen that the slope of the second batch is less steep, demonstrating a greater range.

The aggregates of these two experiments had an appearance indistinguisable from those of Example 2.

EXAMPLE 13

To show the effect of adding the initiator at 80° C., and thus shortening the reaction time, two batches were made. In both cases the reactor was that of Example 2, the aqueous phase was 0.5% polyvinyl alcohol, and the disperse phase the polyester mentioned in Example 1 at 40% in a mixture of equal parts styrene and methyl methacrylate. In both cases ammonium persulphate was used to initiate polymerisation (at 3% on the disperse phase), but in one case it was added before heating to 80° C., while in the other the batch was heated to 80° C., before it was added. In the first case, after a 30 minute heat-up and 40 minutes at 80° C., reaction was complete yielding aggregates, 80% by weight between 13 and 30 μm. The second batch had a reaction time of 35 minutes and yielded aggregates, 80% being between 10 and 21 μm. The result of Coulter Counter analysis of these products is shown in FIG. 3 of the accompanying drawings.

Again the aggregates of these experiments are indistinguishable from those of Example 2.

Examples 14 to 17 show the effect of varying the natures and proportions of the monomers and thickeners. In all cases, polymerisation was effected using 3% by weight on the weight of the polymerisable material of ammonium persulphate as initiator added at 25% in the 8 liters can of Example 1 at 80° C. using an 11 cm. diameter Cowles agitator operated at 1400 rpm. In all cases the dispersion contained 0.46% by weight of polyvinyl alcohol as a colloid stabiliser. The total quantities of polymerised raw material and of aqueous phase were as for Example 1.

EXAMPLE 14

In this experiment, a 70% solution of unsaturated polyester in styrene was used. Reaction was complete 20 minutes after the batch reached 80° C. The product consisted essentially of polymer aggregates having a maximum dimension of 10 to 15 microns, of very uniform particle size. The aggregates though having a surface appearance as those of Example 2, were more regular in shape.

EXAMPLE 15

The disperse phase consisted of a 40% solution of saturated polyester in styrene. The product mostly had a particle size of 15 to 30 microns, but some particles up to 50 microns were visible in the microscope. The aggregates were more regular in shape than those of Example 2, however the constituent primary particles were less extensively fused.

EXAMPLE 16

The disperse phase consisted of a solution of 40 parts unsaturated polyester solution in 60 parts of a 1:1 mixture of methyl methacrylate and vinyl acetate.

The product consisted of a few primary particles up to 2 microns and aggregates from 5–20 microns, with most having a maximum dimension of about 10 microns. The shape of the aggregates was similar to those of Example 2, however, the constituent primary particles were very extensively fused.

A similar experiment in which the disperse phase consisted solely of vinyl acetate was performed in the equipment of Example 12.

The resultant aggregates were predominantly of maximum dimension, about 5 microns with isolated individuals up to 20 microns. The constituent primary particles were fused so extensively as to have lost almost all individual identity.

EXAMPLE 17

The disperse phase consisted of:

| | |
|---|---|
| Styrene | 16.2% by weight |
| Methyl methacrylate | 23.8% |
| N-butoxymethylacrylamide | 20% |
| Saturated polyester | 40% |

The product had weight average particle size of 25 microns. A film of the particles was air dried for 15 minutes and then baked at 160° C. for a further 15 minutes, giving rise to a coherent thermoset film.

EXAMPLE 18

The disperse phase consisted of:

| | |
|---|---|
| Styrene | 48% by weight |
| N-butoxymethylacrylamide | 12% |
| Epoxy resin (Epon 1001, Shell Chemicals) | 40% |

The polymer aggregate had weight average particle size of 30 microns.

Examples 19 to 23 relate to polymerisation processes in which no thickener was present in the disperse phase. In all cases, polymerisation was performed at 80° C. in an 8 liter can using 3% ammonium persulphate as catalyst, agitation being provided by an 11 cm. diameter Cowles agitator rotating at 1400 rpm. 4.5 liters of aqueous phase were used in each case.

EXAMPLE 19

The monomer was 200 grams of methylmethacrylate, added over a period of 1½ hours at 80° C. The aqueous phase contained 0.46% of polyvinyl alcohol and 1500 grams of titanium dioxide pigment was dispersed in the aqueous phase before the start of polymerisation. Aggregates of up to 10 microns were present, however, most had a maximum dimension of about 2 microns. All had a very rough surface appearance, the constituent primary particles being readily distinguised and having a diameter ranging from 0.2 to 0.4 microns.

EXAMPLE 20

The aqueous phase contained 1% of polyvinyl alcohol. 1300 grams of the monomer mix was used containing styrene, 47%; methylmethacrylate, 47%; glycol dimethacrylate, 6%; all the monomers were added initially. The polymer aggregate had uniform size in the range of 10 to 25 microns, together with a number of primary particles. The aggregates were of predominantly regular shape, however, the surface was moderately densely covered with spines, of length approximately 2 microns, in which the constituent primary particles could be distinguised with some difficulty. The surface between the spines was extensively fused.

EXAMPLE 21

The aqueous phase contained 1% of polyvinyl alcohol. 1500 grams of titanium dioxide pigment was dispersed in the aqueous phase. To this was added 365 grams of mixed monomer comprising styrene, 47%; methylmethacrylate, 47% and glycol dimethacrylate, 6%. The dispersion was then heated to 80° C. to effect polymerisation. The product consisted of polymer aggregates of from 4 to 20 microns of which the majority were around 10 microns maximum dimension. The aggregates were of highly irregular shape with the rough surface noted in Example 19.

EXAMPLE 22

The aqueous dispersion contained 1% of polyvinyl alcohol. The monomer was 1300 grams of methylmethacrylate, added at the outset. The product consisted of polymer aggregates in the size range 5 to 15 microns, mostly about 10 microns.

EXAMPLE 23

The aqueous phase contained 1% of polyvinyl alcohol. The mixture of monomers (1300 grams) was 95% styrene with 5% glycol dimethacrylate, all added at the outset. The product comprised polymer aggregates mostly in the particle size range of 2 to 15 microns, though some particles ranged up to 30 microns maximum dimension.

Examples 24 and 25 relate, as does Example 21 above, to experiments in which pigment, extender or resin was picked up during formation of the aggregates. Experiments were performed in an 8 liter can at 80° C. using an 11 cm. diameter Cowles agitator operated at 1400 rpm, and 3% ammonium persulphate as the catalyst. 4.5 liters of aqueous phase were used in each experiment.

EXAMPLE 24

The aqueous phase contained 0.46% of polyvinyl alcohol. The polymerisable material was 750 grams of a solution of 40 parts of unsaturated polyester in 60 parts of styrene. To a dispersion of this polymerisable material in the aqueous medium was added as a 50% aqueous dispersion 500 grams of unpigmented resin beads of a particle size around 0.4 microns of a cross-linked emulsion copolymer of styrene with methylmethacrylate containing 3% glycol dimethylacrylate. The dispersion was heated under high shear to effect polymerisation. The product consisted of polymer aggregates of 25 to 30 micron size, with some primary particles around 2 microns size; the small styrene/methylmethacrylate resin beads had been entirely absorbed into the polymer aggregates and were indistinguishable from the primary particles.

EXAMPLE 25

The aqueous phase contained 0.46% polyvinyl alcohol. The polymerisable material was a solution of 40 parts of unsaturated polyester in 60 parts of styrene. An extender, calcium carbonate sold under the Trade Name Opti White P280, was present in an amount of 68% of the non-volatile material. The extender (795 grams) was dispersed in the aqueous phase followed by the resin (375 grams), and the dispersion heated to effect polymerisation. The produce was polymer aggregates having particles in the size range 5 to 25 microns.

EXAMPLE 26

To the dispersion of polymer aggregates obtained in Example 2 was added titanium dioxide pigment in an amount of 33% by weight on the non-volatile material. A mixture of monomers was provided in an amount of 30% by weight on the weight of the pigment, consisting of:

| | |
|---|---|
| Styrene | 6 parts |
| 2-Ethylhexylacrylate | 3 parts |
| Methylmethacrylate | 1 part |

The monomer mixture was added to the dispersion over 1 hour at 80° C. in an 8 liter can, shear being provided by an 11 cm. diameter Cowles agitator operated at 1400 rpm. The catalyst was ammonium persulphate. After polymerisation was complete, no free pigment was visible in the dispersion, and the polymer aggregates all looked similar to, but more opaque than, those observed before the experiment. It was evident that the monomer mixture had polymerised as a coating on the polymer aggregate and had picked up the pigment particles with it.

EXAMPLE 27

The product of the first batch of Example 12, 600 g at 100% NVM, was dispersed in 3500 g of a 0.5% PVA in water solution, together with 600 g of TiO$_2$. 200 g of a 40% polyester in styrene solution (as in Example 1) was added and the mixture was heated to 80° C. in the same reactor as Example 2. At 80° C. 6 g of ammonium persulphate was added, and after 30 minutes plymerisation was deemed complete. The appearance of the aggregates had changed from translucent to white and opaque.

EXAMPLE 28

Example 26 was repeated using an Iron Oxide Red pigment instead of TiO$_2$. This gave a visual proof of pick-up, as *all* the aggregates were red. Micrographs revealed a change in the nature of the surface—although the particles were unquestionably still aggregates, the surface seemed to have been smoothed out somewhat.

EXAMPLE 29

To 2250 g of an aqueous 0.5% polyvinyl alcohol solution were added 200 g of white spirits and 10 g of a surfactant to aid dispersion of the non-solvent. 500 g of 40% unsaturated polyester in styrene were added, followed by 15 g of ammonium persulphate. The batch was heated to 80° C. in the reactor of Example 12 and held for one hour. Micrographs showed that the resulting aggregates had a size of 5–10 microns. The aggregates were filtered, yielding a filter-cake with a 33% non-volatile content, and a water content of 51%. This means that 39% of the volume of the particles is white spirits, which, when air dried, leaves vesicles.

The aggregates were of irregular shape and under low magnification appeared to have a smoother surface than those of Example 2. Under high magnification clearly defined primary particles of unusually small size (in the order of 0.2 microns diameter) were evident.

By the same process we have incorporated into aggregates tri-butyl tin oxide. This substance is a liquid which has anti-foulant properties.

EXAMPLE 30

Illustrates the use of the polymer aggregates of the invention in coating compositions.

A latex paint was prepared by accepted techniques for water based paints and having the following composition.

| | Parts Wt. |
|---|---|
| Rutile titanium dioxide | 25.8 |
| Hydroxy ethyl cellulose (2% solution in water) | 5.4 |
| Tetrasodium pyrophosphate | 0.1 |
| Proprietary dispersant | 1.4 |
| Aqueous Ammonia - 0.880 S.G. | 0.3 |
| Aluminium silicate | 5.3 |
| Poly (vinyl acetate/butyl acrylate) aqueous latex. 55% wt. solids | 20.7 |
| Ethylene glycol | 2.0 |
| Product of Example 11 (48% NVM) | 11.5 |
| Proprietary defoamer | 0.4 |
| Water | 27.1 |

When applied by brush to hardboard panels and allowed to harden overnight, a smooth paint film of low gloss and good hiding power was formed. Marks from lipstick and crayon could be completely removed from the film by rubbing with a cloth moistened with household detergent, without leaving glossy patches. The film was unusually resistant to removal by wet abrasion.

The non-volatile content was 49.2% weight of which 11.2% was polymer aggregate containing titanium dioxide.

Properties of paint films formed from the coating compositions of this invention can be assessed under five headings, namely (a) Opacity, (b) Burnish resistance, (c) Scrub resistance, (d) Stain removal, and (e) Gloss-up after stain removal. These will now be discussed in turn.

(a) Opacity

This is conventionally measured as a contrast ratio as described in Specification ASTM D2805/70.

(b) Burnish resistance

This is measured by giving 25 rubs to the surface of the paint with a soft dry cloth across the direction of the brush marks. The degree of gloss development is assessed at a low angle of vision and rated from 0 (very high gloss development) to 10 (no gloss development).

(c) Scrub resistance

The measurement of this property involves applying the composition at 112 microns to a proprietary scrub chart, a standard being applied alongside the test batch. The film is allowed to dry in a vertical position for 16 hours, then clamped to the base plate of a scrub machine and tested in the known manner.

(d) Stain removal

Twenty four hours after application, stains are applied to the film, then cleaned off using a standard procedure. The stain removal is rated visually on a 0–10 scale for each individual stain; 0 is no removal of stain and 10 is complete removal.

(e) Gloss-up after stain removal

This is measured in the same was as burnishing described above under (b), except that a cloth moistened with water is used in place of a dry one.

EXAMPLES 31 to 35

These Examples show the effect of variation of polymer aggregate particle size in a latex paint composition of known type, respectively both containing and not containing non-solvent.

TABLE 1

| | Example No. | | | | |
|---|---|---|---|---|---|
| Ingredient | 31 | 32 | 33 | 34 | 35 |

TABLE 1-continued

| | Example No. | | | | |
|---|---|---|---|---|---|
| | 31 | 32 | 33 | 34 | 35 |
| Polymer Aggregate 30–50 microns (70% NVM) | 142.8 | | 71.4 | 142.8 | |
| Polymer Aggregate 5–10 microns (95.4% NVM) | | 104.8 | 52.4 | | 104.8 |
| 1.6% Cellulose thickener | 311.0 | 311.0 | 311.0 | 311.0 | 311.0 |
| Water | 166.2 | 204.2 | 185.0 | 166.2 | 204.2 |
| 25% Anionic Dispersant solution | 10.0 | 10.0 | 10.0 | 10.0 | 10.0 |
| Defoamer | 3.0 | 3.0 | 3.0 | 3.0 | 3.0 |
| Tributyl tin fungicide | 0.3 | 0.3 | 0.3 | 0.3 | 0.3 |
| Tetrasodium pyrophosphate | 1.0 | 1.0 | 1.0 | 1.0 | 1.0 |
| Ammonia | 1.0 | 1.0 | 1.0 | 1.0 | 1.0 |
| Surfactant | 2.0 | 2.0 | 2.0 | 2.0 | 2.0 |
| Titanium dioxide | 323.0 | 323.0 | 323.0 | 323.0 | 323.0 |
| Aliphatic hydrocarbon (non-solvent) | 60 | 60 | 60 | | |
| Acrylic resin binder latex (47% solids) | 221.0 | 221.0 | 221.0 | 221.0 | 221.0 |
| Hydroxy ester solvent | 10.0 | 10.0 | 10.0 | 10.0 | 10.0 |
| Phenyl mercury preservative (10% Hg) | 1.0 | 1.0 | 1.0 | 1.0 | 1.0 |
| Property | | | | | |
| Contrast Ratio % | 95.8 | 93.9 | 95.5 | 92.3 | 90.1 |
| Stain removal | 6 | 6 | 6 | 6 | 6 |
| Burnishing | 10 | 7 | 9½ | 9½ | 7 |
| Scrub resistance | 800 | 385 | 660 | 1200 | 850 |

EXAMPLE 36

Example 35 was repeated replacing the pigment-free aggregates on a volume basis with the aggregates of Example 27 (which consist of a polyester core with an outer coating of TiO$_2$ in Styrene/unsaturated polyester).

This paint contained 0.4 Kg TiO$_2$/liter and gave contrast ratio 95.6. Application by brush or roller produced matt, smooth and velvety films having good burnish and stain resistance properties. Resistance to wet abrasion was good.

EXAMPLE 37

This Example illustrates a coating composition in which the pigment is completely contained in the polymer granules.

| | Parts |
|---|---|
| Mill base | |
| Polymer aggregates containing 80% Rutile Titanium Dioxide (5–10 microns) | 410.0 |
| Polymer Aggregates Pigment free (35–50 microns) | 15.0 |
| 1.75% Solution in water of Cellulose thickener | 35.0 |
| Water | 229.0 |
| Anionic dispersant, 25% Soln. | 10.0 |
| Antifoam solution | 3.0 |
| Tributyl tin fungicide | 0.3 |
| Tetra sodium pyrophosphate | 1.0 |
| Ammonia | 1.0 |
| Surfactant | 2.0 |
| Aliphatic non-solvent | 60.0 |
| Water (mill wash) | 60.0 |
| Added after milling | |
| Acrylic resin binder | 221.0 |
| 1.75% Solution of Cellulose thickener | 176.0 |
| Hydroxy ester solvent | 10.0 |
| Phenyl mercury preservative (10% Hg) | 1.0 |
| Water | 35.0 |

The paint has an aggregate volume concentration of 62%. The proportion of unpigmented aggregates is 7.9% by volume of total aggregates and 4.9% by volume of total non-volatile content.

Application by brush or roller produces films which are matt, smooth and velvety with good wear and scratch resistance, and having the following properties:

| | |
|---|---|
| Contrast Ratio | 96.4% |
| Scrub | 460 |
| Stain removal | 8 |
| Gloss-up | 9 |
| Burnish resistance | 9.5 |

The following Examples illustrate the use of pigment-free aggregates.

EXAMPLE 38

Cross-linked-aggregates of size range 10 to 15 microns prepared as described in Example 14 were separated by filtration flushed successively with ethyl alcohol and white paint, followed by air-drying.

They were added to the base-component of a 2-component proprietary polyurethane enamel in an amount to provide 14% of aggregate by weight on the weight of dry film of the mixed material, the gloss of which when viewed at an angle of viewing of 60° becoming thereby reduced from 98% to 18%. Curing properties, film hardness and package stability were comparable with the untreated enamel.

EXAMPLE 39

In a similar manner to the last Example, a proprietary pre-gloss air-drying enamel was treated with an amount of the same aggregates sufficient to produce a coating containing 11.5% by weight of aggregates on the total dry film, the finish being thereby reduced to semi-gloss, giving a gloss reading of 13% at an angle of viewing of 60°, as compared with 93% for the untreated enamel. As before, curing properties, film hardness and package stability were unaffected.

What we claim is:

1. Substantially uniform, discrete polymer aggregates in the form of discrete particles of controlled particle size below 150 microns maximum dimension which are themselves aggregates of primary particles of a polymer or polymers derived from at least one ethylenically unsaturated monomer together with from 0 to about 400%, by weight on the weight of the monomer, of an organic thickener compatible with the monomer, said aggregate particles containing from 0 to about 95% by weight of pigment and/or extender and having been formed during polymerization of the monomer.

2. Polymer aggregates as claimed in claim 1 wherein at least 80% by weight of the aggregate particles have a maximum dimension of from 0.5 to 40 microns.

3. Polymer aggregates as claimed in claim 1, wherein at least 80% by weight of the aggregate particles have a miximum dimension between half and twice the weight average maximum dimension of the batch.

4. Polymer aggregates as claimed in claim 1, wherein the organic thickener was used in an amount of from 10% to 100% by weight of the monomer.

5. Polymer aggregates as claimed in claim 1, wherein the organic thickener is an unsaturated polyester resin.

6. Polymer aggregates as claimed in claim 1, containing from 20% to 70% by weight of pigment and/or extender.

7. Polymer aggregates as claimed in claim 1, wherein pigment and/or extender is present distributed uniformly throughout the polymer aggregate particles.

8. A method of making the polymer aggregates claimed in claim 1, which method comprises:
   (a) providing an aqueous dispersion of at least one ethylenically unsaturated monomer together with from 0 to about 400%, by weight of the monomer, of an organic thickener compatible with the monomer, a hydrophilic colloid being present in the aqueous phase of the dispersion, said hydrophilic colloid being other than a low molecular weight colloid of the type usually known as dispersing or emulsifying agents;
   (b) introducing a polymerisation initiator into the aqueous phase of the dispersion, and
   (c) maintaining the dispersion under conditions of high shear and continuing polymerisation to substantial completion thereof.

9. A method as claimed in claim 8, wherein the hydrophilic colloid is a polyvinyl alcohol or a polyacrylate present at a concentration of from 0.1 to 2% by weight of the aqueous phase.

10. A method as claimed in claim 8, wherein the polymerisation reaction is carried out in the presence of solid particles or fluid droplets in the aqueous phase of the dispersion, whereby the particles or droplets are captured and incorporated into the polymer aggregates.

11. A method as claimed in claim 8, wherein the polymerisation reaction is carried out in the presence of solid particles or fluid droplets in the disperse phase of the dispersion, whereby the particles or droplets are incorporated into the polymer aggregates.

12. A method as claimed in claim 8, wherein the dispersion has a salt concentration, excluding polymerisation initiator of up to 3.0% by weight of the disperse phase.

13. A method as claimed in claim 8, wherein there is used from 0.5% to 3.0%, by weight of the polymerisable material, of polymerisation initiator and polymerisation is effected in a time of not more than two hours at a temperature of from 55° C. to 90° C.

14. A method as claimed in claim 8, wherein conditions of high shear are maintained during polymerisation by the use of a stirrer having a diameter at least half the diameter of the polymerisation vessel and a peripheral speed of at least two meters per second.

15. Polymer aggregates made by the method claimed in claim 8.

16. A coating composition comprising polymer aggregates as claimed in claim 1.

17. A coating composition as claimed in claim 16 in the form of a latex paint.

18. A coating composition as claimed in claim 16, comprising from 5 to 85%, by volume on the volume of the non-volatile material, of the polymer aggregates.

19. A coating cmposition as claimed in claim 17, wherein part or all of the pigment is present in the polymer aggregates.

20. A coating composition as claimed in claim 17, comprising a continuous aqueous phase and particles of coalescable polymer dispersed therein, and containing a non-solvent for said coalescable polymer in an amount and of sufficiently low volatility to produce, on first removing water from said continuous phase and secondly removing said non-solvent, a continuous, non-porous, microcellular and opaque film having minute, discrete and substantially closed voids.

21. A coating composition as claimed in claim 16, wherein the polymer aggregates constitute the sole film-forming component.

* * * * *